United States Patent Office 3,264,261
Patented August 2, 1966

---

3,264,261
HARDENABLE EPOXY RESIN COMPOSITIONS
Bernard Peter Stark, Stapleford, England, assignor to Ciba Limited, Basel, Switzerland, a company of Switzerland
No Drawing. Filed Nov. 29, 1961, Ser. No. 155,837
Claims priority, application Great Britain, Dec. 1, 1960, 41,440/60
2 Claims. (Cl. 260—47)

This invention relates to a new type of hardenable epoxy resin composition and to the cured products obtainable therefrom.

Anhydrides of aliphatic, aromatic, and cycloaliphatic carboxylic acids have been extensively used as curing agents for epoxy resins. It is well known that the bis- and poly-anhydrides of carboxylic acids which contain more than two carboxyl groups, for example pyromellitic dianhydride, di-anhydrides of the general Formula I:

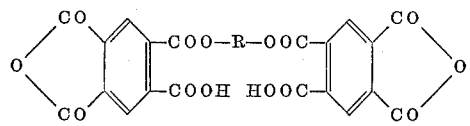

where —O—R—O— is the radical of a glycol, naphthalene-2,3,6,7-tetracarboxylic dianhydride, and the dianhydride of 1,2,4-tricarboxy-3-carboxymethyl-cyclopentane, have, under certain circumstances, certain advantages as hardeners for epoxy resins over the simple monoanhydrides of dibasic acids. One advantage is that epoxides hardened with dianhydrides frequently have higher heat stabilities than those hardened with monoanhydrides. There are, however, certain disadvantages attendant upon the use of the dianhydrides mentioned above: they often have high melting points and are difficult to dissolve in epoxy resins. Very reactive dianhydrides such as pyromellitic dianhydride have the further disadvantage that the usable lives of epoxy resin-hardener mixtures containing such dianhydrides are inconveniently short at the temperatures which are necessary to maintain the dianhydride in solution in the epoxy resin.

According to the present invention a new hardenable epoxy resin composition comprises an epoxy resin and, as hardener therefor, a mixture of the compound of the formula II

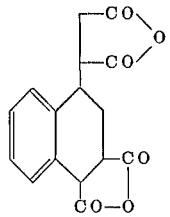

with the compound of the formula III

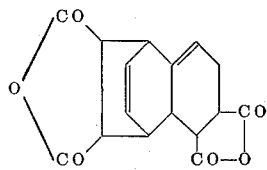

and/or a mixture of a compound of the general formula IV

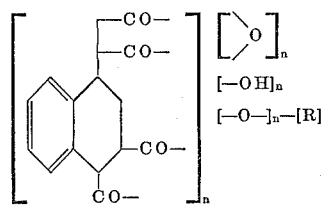

with a compound of the general formula V

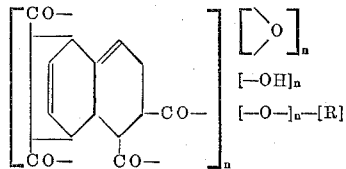

wherein $n$ is a whole number greater than one and R is an organic radical, for example a hydrocarbon radical, having a valency equal to $n$. Formula II represents the dianhydride of 3,4-dicarboxy-1,2,3,4-tetrahydronaphth-1-yl-succinic acid and Formula III represents the dianhydride of 5,6,9,10 - tetracarboxy-tricyclo$(6,2,2,0^{2,7})$-dodeca-2,11-diene.

The hardener mixtures which are used in the compositions of this invention have the important advantage, over most of the dianhydrides which have hitherto been used for this purpose, that they have a lower melting point. For instance, the dianhydride of Formula II, when pure, has a melting point of 202–203° C., and the melting point of the pure dianhydride III is 268° C., but the mixture of these two dianhydrides, when obtained by the method which is outlined below has a melting point of ca. 180–185° C. Thus, the mixture of compounds is more easily mixed with and dissolved in epoxy resins on heating. Moreover, the hardeners of the present invention are less reactive as hardeners for epoxy resins than are the commonly-used aromatic dianhydrides, for example pyromellitic dianhydride, and in consequence the hardenable compositions of the invention have long and useful lives ("pot-lives") at the temperatures necessary to maintain the hardeners in solution in epoxy resins.

A mixture of the components of Formulae II and III is conveniently prepared by reacting styrene with maleic anhydride in the presence of a suitable inhibitor of polymerization, for example picric acid, and in the presence of a suitable solvent, for example, benzene. Suitable conditions for the reaction have been described by K. Alder, R. Schmitz-Josten, H. Brookmann, K. Huhn and H. Gaebler, Annalen (1955), 595, 1. It is not necessary for the purposes of the present invention to separate the products of the reaction from the mixture in which they are formed, and indeed it is often preferable to use the solid obtained by reacting styrene with maleic anhydride under the conditions described by Alder et al. (loc. cit.) without extensive purification. It is merely necessary to cool, separate by filtration and wash the reaction product.

A mixture of compounds of the general Formulae IV and V may conveniently be prepared by reacting of a mixture of the compounds of Formulae II and III with a di- or poly-hydroxy compound of the general Formula VI VI                R(OH)$_n$ wherein R and $n$ have the meanings previously assigned to them, for example ethylene glycol, propylene glycol, polyethylene glycol, bis(4-β-hydroxy-ethoxyphenyl)-dimethyl methane, glycerol, and pentaerythritol.

The mixtures of compounds of the general Formulae IV and V are new products and accordingly the mixtures and the methods for their preparation as set forth above represent further features of the present invention.

According to another feature of the present invention there are provided hardened epoxy resin compositions obtained by heating the aforesaid new hardenable compositions.

Epoxy resins which may be hardened in accordance with the present invention are, for example, the polyglycidyl ethers of polyalcohols, such as butane-1,4-diol, or of polyphenols, such as resorcinol, bis-(4-hydroxyphenyl)- dimethylmethane, or condensation products of aldehydes with phenols (Novolaks), polyglycidyl esters of polycarboxylic acids, such as phthalic acid, aminopolyepoxides such as are obtained by the dehydrohalogenation of the reaction products from epihalohydrins and primary or secondary amines such as 4,4'-di(monomethylamino)-diphenylmethane, and polyepoxides of alicyclic compounds.

Other hardeners may also be present in the compositions of this invention, for example polybasic carboxylic acids and their anhydrides, e.g. phthalic acid, phthalic anhydride, methylendomethylenetetrahydrophthalic anhydride, dodecenylsuccinic anhydride, hexahydrophthalic anhydride, hexachloroendomethylenetetrahydrophthalic anhydride, or endomethylenetetrahydrophthalic anhydride, or their mixtures, or maleic or succinic anhydrides. In some cases, accelerators for the action of the hardening agent may also be present; suitable such accelerators are tertiary amines such as benzyldimethylamine, and polyhydroxy compounds such as hexanetriol and glycerol.

The compositions of this invention may also contain fillers, plasticisers or coloring agents, for example asphalt, bitumen, glass fibers, mica, quartz powder, cellulose, kaolin, finely-divided kieselguhr (Aerosil), or metal powder.

The aforesaid compositions may be used in the filled or unfilled state, e.g. in the form of solutions or emulsions, for the preparation of epoxy resin-hardener mixtures for use as textile auxiliaries, laminating resins, varnishes, lacquers, dipping resins, casting resins, and encapsulating, coating, filling and packing materials, adhesives and the like.

The following examples will serve to illustrate the invention. In these examples parts are by weight, and temperatures are in degrees centigrade.

*Example 1*

A mixture of styrene (75 g.), maleic anhydride (150 g.), picric acid (10 g.) and benzene (100 ml.) was stirred and heated under a reflux condenser, over a boiling water bath, for 45 hours. The reaction mixture was then allowed to cool slowly to room temperature during 18 hours, and it was then filtered. The solid thus obtained was washed, while on the filter, with warm benzene and then with a cooled mixture of light petroleum and ethyl acetate. It was then dried at room temperature for 48 hours under a pressure of 15 mm. of mercury. The resulting mixture (120 g.) of the dianhydrides of Formulae II and III melted in the range 180–185° C.

63.9 parts of the above mixture were mixed with 100 parts of a liquid epoxy resin of epoxy value 5.2 epoxy equivalents per kg. (obtained in a known way by the reaction of 4,4'-dihydroxydiphenyldimethylmethane with epichlorohydrin in the presence of aqueous sodium hydroxide). The mixture was warmed and stirred until the solid dissolved in the resin and then 1 part of benzyldimethylamine was added with stirring. The resulting mixture was cast into a mould and heated for 1 hour at 100° and then for 16 hours at 180°. A hardened casting was obtained having a heat deflection temperature (measured according to A.S.T.M. D 648–56) of 220°.

*Example 2*

The mixture of epoxy resin, hardener, and benzyldimethylamine described in Example 1 was heated for 1 hour at 100° and then for 32 hours at 180°. A hardened casting was obtained which had a heat deflection temperature (measured according to A.S.T.M. D 648–56) of 232°.

*Example 3*

30 g. (0.1 mole) of the mixture of bisanhydrides described in Example 1 were added in portions during 1 hour to 51.25 g. (0.05 mole) of a sample of polypropylene glycol having an average molecular weight of 1025. The mixture was kept at 185–190° during the addition and thereafter for 18 hours. On cooling, the adduct was obtained as a very viscous liquid.

23 g. of this adduct were mixed with 10 g. of the polyglycidyl ether described in Example 1 and with 0.1 g. of benzyldimethylamine. The resulting mixture was cast into an aluminum mould and heated for 24 hours at 140°, at the end of which time a flexible light brown insoluble hardened resin was obtained.

*Example 4*

60 g. (0.2 mole) of the mixture of bisanhydrides described in Example 1 were heated to 200°, and diethyleneglycol (10.6 g., 0.1 mole) was added with stirring during 8 minutes. The mixture was heated at 200° for a further 7½ hours; on cooling, an adduct (M.P. ca. 115°) was obtained.

*Example 5*

10 g. of the polyglycidyl ether described in Example 1 were mixed at 135° with 10 g. of the adduct described in Example 4; 0.1 g. of benzyldimethylamine were then added, and within 5 minutes the mixture had hardened to an infusible solid mass.

*Example 6*

5 g. of the adduct described in Example 4 were dissolved at 140° in 5 g. of methylendomethylenetetrahydrophthalic anhydride. 10 g. of the polyglycidyl ether described in Example 1 were then added, followed by 0.1 g. of benzyldimethylamine. The mixture was then cast into a mould and was heated for 18 hours at 120°, at the end of which time a pale yellow-brown hardened casting was obtained.

*Example 7*

In this example it is demonstrated that whereas it is possible to dissolve the hardener prepared according to Example 1 (Hardener A) in a commercially available cycloaliphatic epoxide it is not possible to dissolve pyromellitic dianhydride (Hardener B) in this same epoxide because gelation occurs before dissolution is complete.

The resin used was an epoxidized dicyclopentadiene derivative having the formula

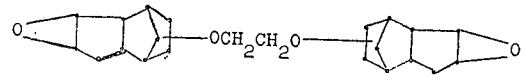

Gelation times were measured by means of a Techne gelation timer.

| Formulation | Preparation of Resin-Hardener mixture and gelation time at 120° |
|---|---|
| 100 parts resin, 75 parts Hardener A (1.00 anhydride equivalent per epoxide equivalent). | Hardener dissolved in the resin after 5 minutes at 140°. The composition was then cooled to 120°. Gelation time at 120° was 30 minutes. |
| 100 parts resin, 41 parts Hardener A (0.55 anhydride equivalent per epoxide equivalent). | Hardener dissolved in the resin as above. Gelation time at 120° was 134 minutes. |
| 100 parts resin, 29 parts Hardener B (0.55 anhydride equivalents per epoxide equivalent). | Resin and hardener were stirred together at 140°. The resin became unstirrable after 35 minutes and much of the hardener remained undissolved. The experiment was repeated at 160° when the mixture became unstirrable after 7 minutes and much of the hardener remained undissolved. |

*Example 8*

In this example it is demonstrated that whereas it is possible to prepare a usable composition by dissolving the hardener prepared according to Example 1 (Hardener A) in a Bisphenol A epoxide it is not possible to utilize pyromellitic dianhydride in the same manner.

The epoxide resin used was that described in Example 1, and the gelation time was measured on a Techne gelation timer.

| Formulation | Preparation of Resin-Hardener mixture and gelation time at 140.° |
|---|---|
| 100 parts resin, 61.5 parts Hardener A. | Resin and hardener stirred together at 160° and a clear solution was obtained after 10 minutes which had a gelation time at 140° of 43 minutes. At 100° the viscosity of the solution was 300 poises, when cooled to 60° it became a soft, sticky solid and at room temperature was a clear, malleable solid. No crystallization of hardener on cooling was observed. |

| Formulation | Preparation of Resin-Hardener mixture and gelation time at 140.° |
|---|---|
| 100 parts resin, 30 parts Hardener B. | Resin and hardener were preheated separately to 140° and then stirred together at this temperature. After 10 minutes the mixture became infusible before all the hardener had dissolved. When the mixture was made up at 180° after preheating the components to this temperature a clear solution was momentarily formed which became infusible after 10 seconds. No technique was found that permitted the preparation of a usable composition in which all the hardener was dissolved. |

*Example 9*

In this example mechanical properties of an epoxide resin cured with a hardener of the present invention are compared with those of a resin cured with pyromellitic dianhydride.

The resin used was that described in Example 1. The castings were prepared and the tests carried out by the methods prescribed and published by the American Society for Testing Materials. Preliminary experiments were performed to establish optimum curing conditions and concentration of hardener. Optimum conditions are defined as those giving the maximum attainable heat deflection temperature.

Formulation 1 containing a hardener of the present invention, was as follows:

100 parts resin,
63.9 parts hardener prepared as described in Example 1,
1 part benzyldimethylamine, and the curing conditions were 1 hour at 100° followed by 24 hours at 180° C.

Formulation 2 containing a prior art hardener, was as follows:

100 parts resin,
31 parts pyromellitic dianhydride,
1 part "Aerosil" (a registered trademark for a finely divided form of silica).

As demonstrated previously, a usable homogeneous solution of resin and hardener cannot be obtained and therefore the pyromellitic dianhydride had to be incorporated as a finely ground suspension. The Aerosil was included to prevent the hardened particles separating out during cure. By this technique an opaque casting can be obtained.

The results of the comparison are tabulated below:

| | Formulation 1 | Formulation 2 |
|---|---|---|
| Flexural Strength, determined according to ASTM D790-59T. | 477 kg./sq. cm | 468 kg./sq. cm. |
| Modulus of Elasticity by Flexure, determined according to ASTM D790-59T. | 0.33×10⁵ kg./sq. cm | 0.31×10⁵ kg./sq. cm. |
| Tensile Strength, determined according to ASTM D638-58T (Type 1 size specimens). | 187 kg./sq. cm | 211 kg./sq. cm. |

What is claimed is:

1. A heat-hardenable 1,2-epoxy compound having a 1,2-epoxy equivalency greater than 1 composition comprising a 1,2-epoxy resin and, as hardener therefor, a mixture of the compound of the formula

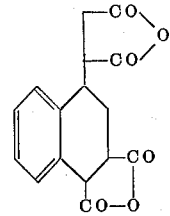

with the compound of the formula

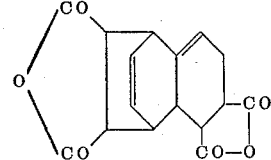

2. A heat-hardenable 1,2-epoxy resin composition comprising (1) a 1,2-epoxy resin having a 1,2-epoxy equivalence greater than one and (2) as a hardener therefor the esterification product from 2 moles of a mixture of the compound of the formula

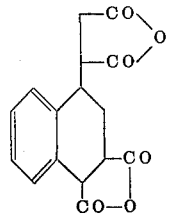

with the compound of the formula

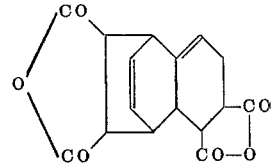

and 1 mole of a glycol selected from the group consisting of polypropylene glycol and diethylene glycol.

References Cited by the Examiner

UNITED STATES PATENTS 2,689,834  9/1954  McNabb _____ 260—47

WILLIAM H. SHORT, *Primary Examiner.*

LOUISE P. QUAST, *Examiner.*

T. D. KERWIN, *Assistant Examiner.*